March 18, 1958 F. FRUENGEL 2,827,546
METHOD AND DEVICE FOR COOLING ELECTRIC
RESISTANCE WELDING MACHINES
Filed Dec. 6, 1955 2 Sheets-Sheet 1
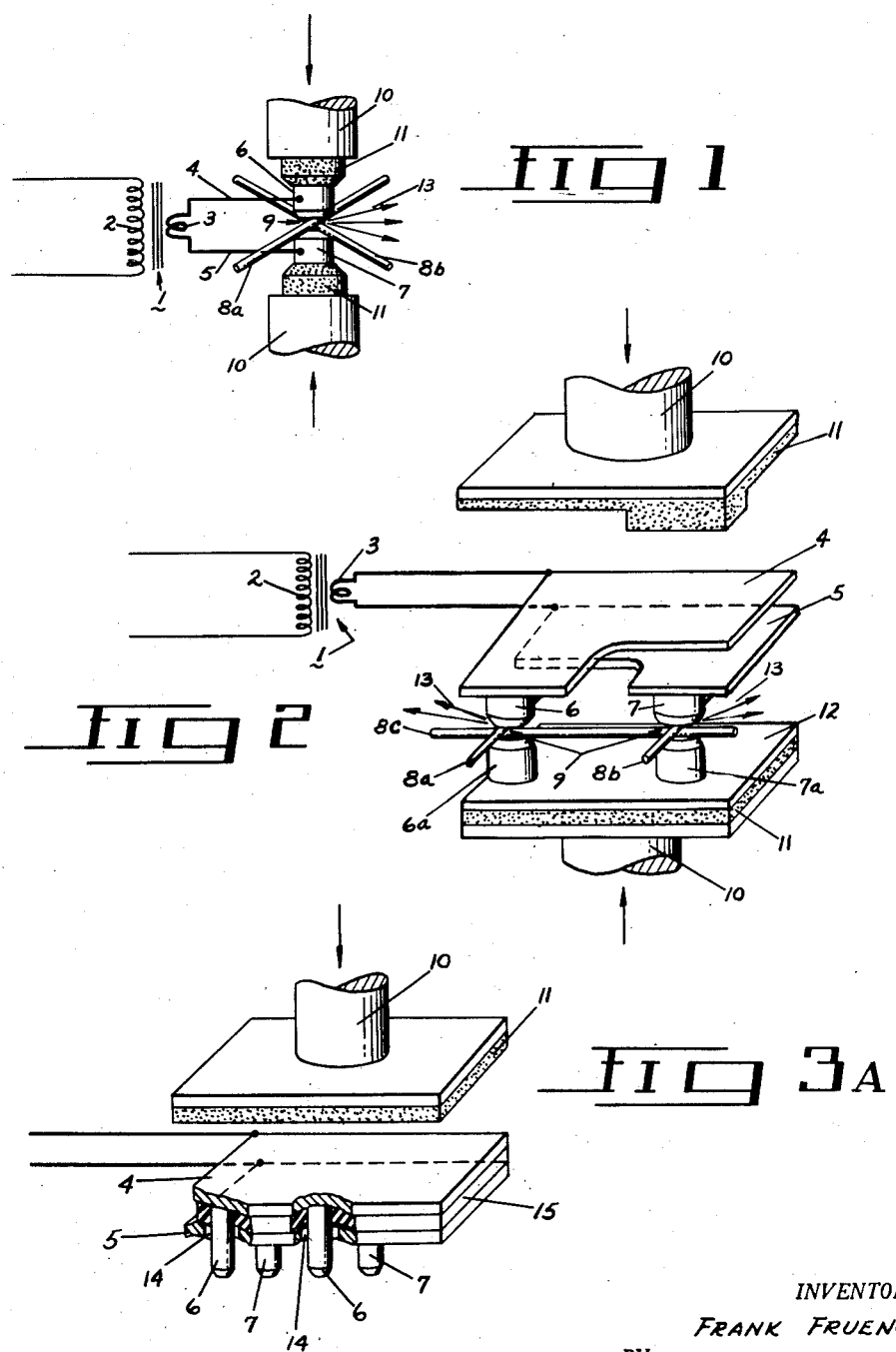
INVENTOR.
FRANK FRUENGEL
BY

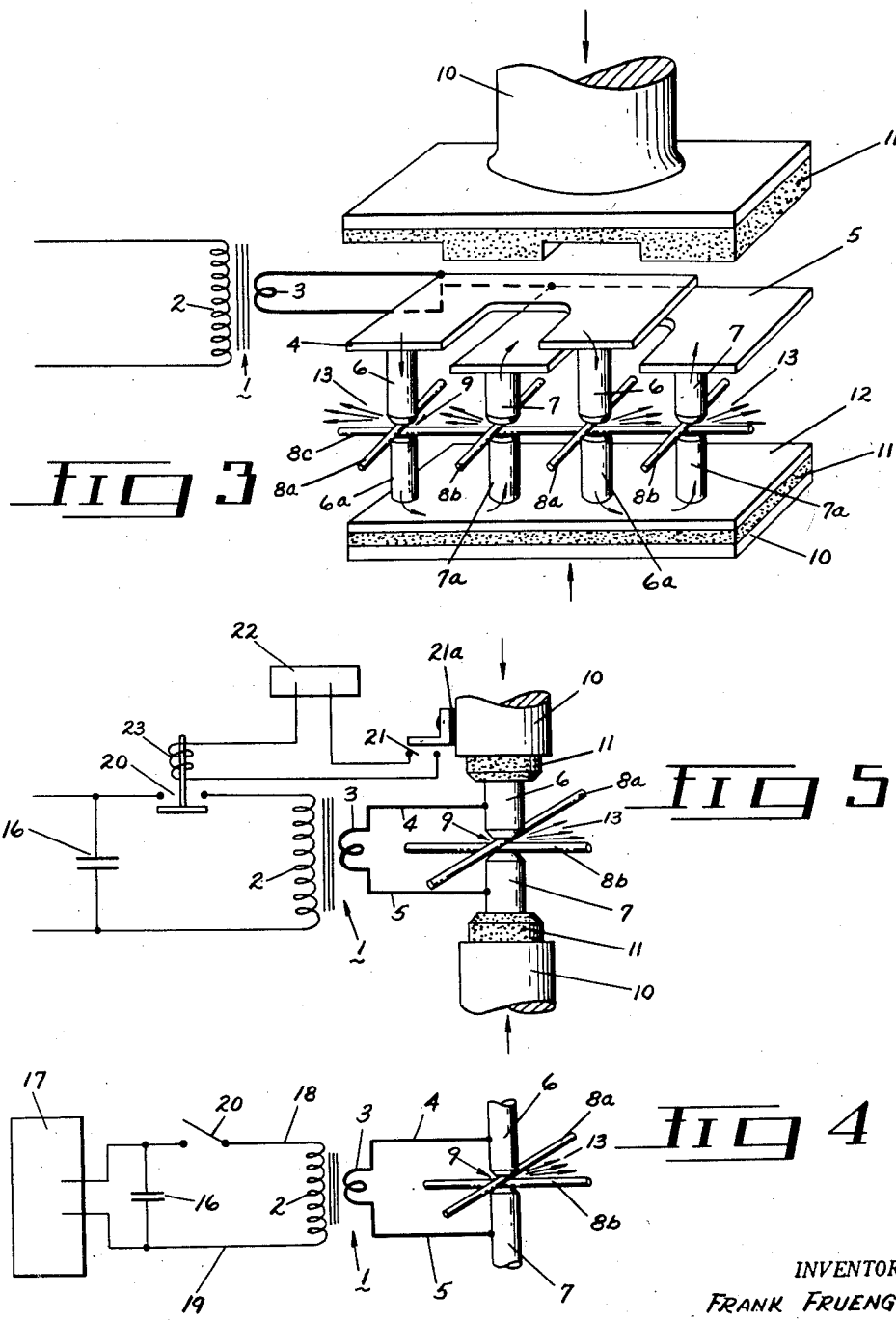

United States Patent Office 2,827,546
Patented Mar. 18, 1958

2,827,546

METHOD AND DEVICE FOR COOLING ELECTRIC RESISTANCE WELDING MACHINES

Frank Fruengel, Hamburg-Rissen, Germany

Application December 6, 1955, Serial No. 551,423

Claims priority, application Germany December 13, 1954

7 Claims. (Cl. 219—117)

This invention relates to electric resistance welding and more particularly to novel cooling means suitable for carrying off the heat produced by the welding process.

In known machines for resistance welding, the work is heated between electrodes by the welding current to such a degree that portions of the work become liquefied and, after interruption of the welding current, solidify again to form the weld which generally has a coarser crystalline structure than other portions of the material which have not undergone the welding process. The welding heat introduced into the weld and stored to a considerable extent in the liquefied material must be dissipated after the weld is completed, and cooling in conventional welding equipment is generally effected by water-cooled electrodes and by slow heat dissipation and conduction into adjacent portions of the work pieces that have been welded together. The drawback of artificial cooling means, which are generally required, is that they complicate electrode construction and make necessary water system installations, a fact that increases first cost particularly in large welding machines. But of graver concern than the complication in the wleding setup itself is the change in the molecular structure taking place in large areas around the completed weld as consequence of artificial cooling, which change in most cases decreases the strength of material at this point to a lower value than in other portions of the welded construction.

The present invention aims at obviating the shortcomings of prior welding methods by providing for carrying-off heat and for cooling of the weld by ejection of material liquefied by the welding current and containing the major portion of the welding heat.

The forces for ejecting the material particles are, in accordance with the invention, electromagnetic forces exerted by the welding current itself while flowing through the weld, and the cooling effect as such may consequently be termed "electromagnetic cooling." The action of such electromagnetic forces effects that excessive molten material is blown off, leaving only a thin liquefied skin which is retained by adhesion on the solid ground material. Thus, the majority of thermal units introduced by the welding current is ejected from the weld with small droplets or particles of molten material.

In agreement with the natural law that each diminishing occurrence creates for itself the greatest possible counteraction against such diminution, the welding current has the tendency to increase the inductance of its circuit; and since it is impossible to reshape rigged circuit portions, it acts within the welding zone on the molten material where the tendency to increase the inductance becomes apparent in that such material is ejected from this zone. The welding circuit, according to this invention, has been shaped to pronounce this phenomenon and preferably has also been shaped so that ejection takes place in a desirable direction.

In order to enhance the afore-mentioned action of the welding current, this invention provides for welding currents of great magnitude and short duration, because the forces acting upon every conductor element increase with the square of the ampere value. Thus the benefits of this invention, while noticeable in all resistance welding methods, gain their fullest advantage in conjunction with the well-known condenser-impulse resistance-welding method in which the welding heat is produced within an extremely short time interval, say, within about $\frac{1}{100}$ second, by a powerful, in some cases transformed, condenser discharge pulse. The great currents involved in such discharges impart to the individual liquid droplets of material on their short path between the work to be welded, often only a few millimeters long, considerable acceleration.

In order not to impair the quality of the weld by the ejection of hot molten particles therefrom, this invention provides for continuous uniform electrode pressure during the welding process by constructing the electrode system, including the electrodes proper and the resilient members interposed between electrodes and the mechanical pressure-producing device, so that its inherent natural frequency is higher than the frequency of the condenser discharge whose first half-wave causes melting of the material in the welding zone. By discharge impulses this half-wave is the rise time of the current from zero to its peak value. Only when the electrode pressure is a continuous follow-through pressure and never permits a vacuum or separation between the work pieces to be welded, it becomes possible to blow excessive molten material from the heating zone and squeeze the thin molten skin, retained by adhesion on the solid weld surface, firmly together to form a new integral structure. The structure of the weld thus produced is fine-crystalline and resembles the structure of a heat-treated material that has been quenched after surpassing its hardening temperature.

The novelty and usefulness of the invention becomes particularly apparent when applied in the operation of large multi-weld welding machines. For example, in a welding machine having a capacity of about 5,000 kilowatts peak load and employing the cooling principle as disclosed by this invention, it is possible to operate without water cooling of the electrodes or other elements of the machine. Owing to the fact that all heat-carrying liquid material is ejected in droplet form, the welded structure leaves the electrodes hand warm and lends the advantage that the operators immediately can grip the welding points and test them for rigidness without danger of burning their hands, a great advantage especially in automatic welding machines.

Another advantage gained by the method of this invention is the fact that the microstructural change about the weld is very small. Only about 10% of the welding material volume generally affected by conventional welding methods shows structural changes, and these are toward a finer crystalline structure. Portions adjacent to the weld show no change whatsoever. Since fine-crystalline welds have generally higher shear and bending strength, this is another advantage gained by the present method.

For a better understanding of the afore-mentioned and other advantages and features of the invention, some preferred embodiments will now be described with reference to the accompanying drawings in which:

Fig. 1 is a perspective view of a single-spot welding arrangement with welding load and welding circuit connections;

Fig. 2 is a perspective view of a double-spot welding arrangement with welding load and circuit connections showing the upper welding pressure producing means in exploded relationship;

Fig. 3 is a similar view as shown in Fig. 2, but of a multiple-spot welding arrangement;

Fig. 3a is a perspective view showing a modified conductor and electrode construction for use in connection with the arrangement of Fig. 3;

Fig. 4 is a diagrammatic illustration of a condenser-discharge resistance welding circuit preferably used for practicing the invention; and Fig. 5 is a modification of the circuit shown in Fig. 4 incorporating a motion- and pressure-dependent switch for initiating the welding impulse.

Referring to the drawings, where alike parts appearing in the several figures are designated by similar reference numerals, there can be seen the welding transformer 1 having its primary 2 connected to a suitable power source (not shown) and having a secondary 3 closely coupled to the primary and consisting generally of only one winding turn. The secondary is connected by conductors 4 and 5 to the electrode system which in Fig. 1 includes the electrodes 6 and 7. The electrodes engage the welding load consisting of the work pieces 8a and 8b which in Fig. 1 are shown as two wires crossing each other and to be welded together at 9. The pressure between the parts to be welded and the electrodes is produced in conventional manner by a welding machine, and members of such machine are designated in the drawing by numerals 10 and 11, whereby 10 are the pressure jaws and 11 are resilient cushioning members to be referred to more fully hereinafter. Whenever a welding-current impulse is passed through the secondary of transformer 1 and thus through the welding circuit, the current traversing the work load melts the material in the welding zone at 9 and some of the molten material, subjected to the force created by electromagnetic action in the circuit, is ejected in the direction indicated by arrows 13 in the form of welding beads. The quantity of ejected material depends thereby to a large extent on the current condition in the welding circuit, and since such ejection has not been considered as being beneficial in prior welding devices, only a small portion of the total quantity of molten material, stemming mostly only from the rim areas of the weld, was ejected; whereas the largest part would remain in the weld and, after interruption of current flow, solidify again. In order to achieve substantial ejection of molten material from the welding zone and thus considerable removal of heat from the weld in accordance with this invention, it is necessary to increase the magnitude of welding current by means to be described hereinafter.

A welding circuit more suitable for obtaining large instantaneous welding currents is depicted in Fig. 2. In this arrangement, the secondary 3 of transformer 1 is connected to the main electrodes 6 and 7 by the flat conductors 4 and 5 which are closely superposed upon each other to reduce their inductance as much as possible. The system shown in Fig. 2 is for operation according to the double-spot welding method, whereby the welding current flows successively through two welding zones formed between the work pieces 8a, 8b and an underlying work piece 8c to which the two former pieces are to be welded. The work pieces are shown as crossing wires, but, of course, also parts of other shape can be welded. In such arrangement in which close superposing of the welding current conductors up to the immediate vicinity of the welding zone is possible, the inductance of the secondary or welding circuit can be made very small, for instance, of an order lower than 0.1 microhenry. Experience has shown that low inductance is essential for successful welding operation in accordance with this invention where rise to very large instantaneous welding currents for intensive electromagnetic-force action is of primary importance. In comparison with the system depicted in Fig. 1, where the welding current must be fed to opposite sides of the work load and superposition of the conductors 4 and 5 close to the welding zone is therefore impossible, the electromagnetic force achievable here is a multiple, mostly several powers of ten higher than there. The favorable circuit condition of Fig. 2 gives rise to ejection of molten material in the direction of arrows 13 at a velocity generally of the order of more than 5 meters per second. It can be seen that the welding circuit at the opposite side of the work load is completed through passive electrodes 6a and 7a (electrodes not connected to the welding transformer) and a bridging member 12. The jaws of the welding machine producing the welding pressure are indicated at 10 and the interposed resilient members at 11. In the figure, both the main electrodes 6 and 7 and the passive electrodes 6a and 7a are shown resiliently supported, but in some cases it will suffice to have resilient mounting only on one side of the work load. The resilient members 11 are indicated as a mass of rubber or the like, but this is merely for illustration and other resilient means such as springs can, of course, be used. In the drawings, the passive counter electrodes are shown as being arranged below the welding load, thus forming the lower portion of the electrode system, but it is to be understood that the system can be modified so that the passive counter electrodes are located at the top. In that case, the active electrodes and their current connections form a stationary system on which the work load is placed and the counter electrode system is arranged to descend for engagement with the work load and for completing the weld.

In order that no current interruption is caused by the jerking action of ejection of molten material from the weld, which, if occurring, would lead to a complete failure of the intended joint, it is important that the speed at which the work pieces are pressed together is higher than the velocity of creating, by the amount of ejected material, a vacuum in the welding zone; or, in other words, the electrodes must follow fast enough to keep the metal surfaces of the parts to be welded in close contact at every instant of the welding process irrespective of the quantity of metal ejected. Vacuum formation can be prevented only when the electrode system, comprising the main electrodes 6, 7 and the counter electrodes 6a, 7a including bridging member 12, in conjunction with the resilient mounting means 11, which are preferably arranged directly adjacent to the electrodes, is designed for a relatively high natural frequency. It has been found, for instance, that 100 cycles per second is sufficiently high in most practical cases. For best results, this natural frequency must be strongly damped. In achieving the natural, damped frequency of the desired character, the resilient members 11 play an essential role. An electrode system having a natural frequency of the order above referred to, in conjunction with resilient pressure means has hitherto been unknown in the welding technique, but it offers together with the other features of this invention a particular advantage in that in addition to the ejection realized by electromagnetic forces, sudden squeezing-out of molten material from the welding zone takes place so that the liquid particles leave at even higher velocity. The cooling effect by molten-metal ejection, as claimed by this invention, is thereby materially enhanced.

The welding circuit shown in Fig. 2 includes only one pair of main electrodes in the welding current path, but it will be clear that a plurality of electrodes in parallel connection can be joined to the secondary of transformer 1. Such arrangement with two pairs of electrodes is shown in Fig. 3. The passive counter electrodes 6a, 7a are all joined by the bridging member 12, and the flow of current through the several welding zones of the work load will be in the direction of the arrows. This, of course, is true by assuming a certain polarity which can be changed without affecting the results. In Fig. 3 notches are shown in the flat conducting members 4, 5 and respective cut-outs in the cushioning means 11 to assure that uniform pressure is applied to all electrodes alike. A modification of the conductor arrangement is indicated in Fig. 3a, where the electrodes 6 in electrical contact with conductor 4 pass through clearance holes 14 in the lower conductor 5, and where the conductors are separated from each other by an insulating layer 15. In this case the resilient member 11 can have a plane face. It will be remembered from the brief description of the drawings that the upper welding pressure and cushioning means are indicated in exploded relationship to show more detail of the electrode system, but that in actual operation the upper electrodes and conducting members are closely and permanently mounted to said pressure and cushioning means.

The current source to be connected to the primary 2 of transformer 1 can be of any high-potential type, but it is advisable to utilize a condenser discharge circuit as diagrammatically indicated in Fig. 4. Here a large storage condenser 16 is connected to be charged from a high-voltage power source of more than 2,000 volts. High charging voltage is essential for gaining considerable advantage over normal power supply operation. The condenser discharge circuit shown includes the conductors 18, 19, a switch 20 interposed in conductor 18, and the primary 2 of transformer 1. The switch 20 is of the quick-make type in order to prevent spark formation at its contacts. There occur only make but no break sparks at these contacts, since condenser 16 is in completely discharged condition whenever the switch opens. The high-potential power source 17 from which condenser 16 is charged is preferably provided with a voltage stabilizing device. Stabilized charging voltage is necessary for gaining the full benefit of an absolutely uniform effect by the present molten-metal ejection method. Stabilizing means for condenser charging sources are generally known in the art and need no further description here, but in the present instance assist in obtaining new results and thus form a part of this invention.

For uniform results of successive welding operations on similar parts it is furthermore of importance that the welding load conductivities have substantially similar values before initiation of the welding discharge pulses. An adjustment for a predetermined proper conductivity can be had by an arrangement illustrated in Fig. 5, where a motion- or pressure-dependent switch 21 is interposed in a circuit including a power source 22 and an energizing winding 23 for actuating the condenser discharge switch 20 which in this case is magnetically actuated. As schematically shown in Fig. 5 switch 21 will be closed when the pressure on the upper pressure jaw 10 exerts a certain pressure on resilient member 11 which compresses in proper relation to the pressure. By proper setting of switch member 21a relative to jaw 10 such predetermined pressure can be adjusted. Thus it can be achieved that the welding load resistance has been reduced by sufficient electrode pressure, for example, to a value of $1/100,000$ ohm, before condenser discharge starts. The motion-and pressure-dependent switching means depicted in Fig. 5 are shown as example only and other constructions will occur to those skilled in the art. Low welding load resistances of the order mentioned above assure that the welding current rises immediately after closing of switch 20 to a magnitude necessary for effective forceful ejection of molten material and thus effective ejection cooling. By combined action of a properly designed welding circuit; an electrode system of proper natural frequency; a stabilized condenser charging source; and a switching system set for proper welding load resistance; it is possible to obtain absolutely homogeneous uniformly welded products, and this independent of supply line voltage fluctuation. The welds obtained by the present method are superior when compared with those obtained by conventional methods. Particular advantages in applying the present method are gained in the manufacture of thermo-elements where even platinum and platinum-rhodium can be welded; in joining contact surfaces of tungsten or other contact material to contact bodies; and in welding steel parts, sections and wires. Owing to rapid cooling by ejection of liquefied material, it is by the present method for the first time possible to weld together radically differing cross-sections and thicknesses of material, because it is hereby not necessary that the welding heat penetrates the whole thickness of the welding load but that only portions at the contacting area of the work pieces are heated.

In designing a welding circuit in accordance with this invention certain requirements must be met which will be pointed out in the following:

When, for instance, it is desirable that a welding droplet or particle having, for instance, a mass of 100 milligrams, shall be ejected after it has melted at a velocity of 5 meters per second, a velocity which is about the minimum for positive ejection from the welding zone, its kinetic energy $\frac{1}{2}MV^2$ must reach a value of about 12 centimeter-grams or $12\times10^{-4}$ joule or wattsecond ($M=$ mass, $V=$ velocity).

During travel of the particle, for instance, from the center of the welding zone to its periphery, there increases the inductance of the welding circuit to a certain degree and this increase of inductance demands a small investment in the magnetic field, since in each conductor element traversed by a current I there is stored by each inductance increment $dL$ the energy increment $dW$ amounting to $\frac{1}{2}dL\times I^2$.

The magnitude of $dL$ desirable for a certain practical purpose can be determined by a simple procedure which consists in that the flat electrode faces of the welding circuit are pressed firmly together after a small grain of silver or iron, in size about equal to the welding or melting zone later to be formed, has been placed substantially at the center between the electrode faces. Then the inductance of the circuit is measured, preferably according to the compensation method, whereafter the grain is placed closely to the periphery of the electrode faces and another measurement is taken. By taking several such measurements with the grain at several positions around the periphery, it can be determined that in a certain radial direction of displacement of the grain from the center toward the periphery, the increase of inductance becomes a maximum, and this direction is the one in which susbtantially the ejection of material during the welding process will occur. This direction can be changed by reshaping the welding circuit and it is preferably so chosen that the ejection is lateral relative to the operator's stand. The increase in inductance by moving the grain as mentioned above is relatively small and in a practical arrangement, for example, it was found that with a total inductance of 0.1 microhenry in the circuit, the increment was 0.001 microhenry, i. e., $10^{-9}$ henry.

Assuming 100% efficiency, the current required for reaching the afore-mentioned ejection velocity of 5 meters per second can be figured by solving the equation $$\tfrac{1}{2}LI^2=12\times10^{-4}$$

for I. Then $$I=\frac{12\times10^{-4}\times2}{L}=\frac{12\times10^{-4}\times2}{10^{-9}}=\text{abt. 1500 amp.}$$

However, since the efficiency cannot be 100%, but generally is only about 10%, and since adhesion and friction losses have to be considered, it will, in order to reach the desired velocity, be necessary to operate at least with 4 to 6 times larger currents. To understand fully the underlying relationships, an estimate of the duration of ejection must be made. When accelerating the particle from, say, 2.5 millimeters to 5 meters per second, the particle remains within the accelerating distance for $1/1,000$ second. Because the duration of ejection must be substantially equal to the total welding time, preferably shorter, it is necessary to operate with very short-time current impulses, preferably of the order of a few milliseconds' duration. For this reason the ejection-cooling method as provided by this invention is particularly adapted for application in connection with condenser-discharge impulse welding machines. These types of machines are apt to spark and means have heretofore been disclosed tending to subdue such sparking as undesirable, but just this characteristic of sparking, being enhanced by the teachings of this invention, renders beneficial service in the welding operation and improves the quality of the welded structure.

In order to assure building-up of large currents within extremely short periods, the inductance of the discharge circuit must be very low. By definition, one volt increases during one second in a circuit of one henry the current by one ampere, and accordingly in one millisecond in a circuit of one microhenry, by 1,000 amperes. In order to maintain the good efficiency found in operation with low welding potentials, generally of the order of 1 to 5 volts, it is necessary to make the inductance of the welding circuit not higher than one microhenry or even lower so as to prevent inductive hindering of current rise. In practice, one microhenry, resulting in a current rise to 1000 amperes within one millisecond at one volt welding potential, is generally low enough for small size spot welding. For larger welding areas, for example in the range of 50 square millimeters, it has been found, that 0.1 microhenry or less secondary inductance is necessary for achieving the benefits of this invention. On the other hand, experience has shown that no particular advantage can be gained by too steep-fronted current impulses, because the current flow must last long enough to eject all molten particles from the welding zone. In accordance with this invention it is therefore advisable, especially in connection with the condenser-discharge impulse welding process, to select the effective inductance of the welding transformer together with the discharge capacitance so that the current has a rise time of the same magnitude as the time required for ejecting the molten particles from the center of the weld to the outside. As aforementioned, the electrode pressure must change simultaneously with rising current and ejection of material, and for that reason the mechanical natural frequency of the electrode pressure means must be relatively high. If, for example, the current rise time is determined for current rise from zero to peak value in one microsecond, which corresponds to a quarter period of a frequency of 250 cycles per second, the mechanical natural frequency of the electrode system, including the electrodes proper and the adjacent resilient pressure members, must be higher, for instance 300 to 500 cycles per second. Such relationship has been found most suitable for small welding machines and is in accordance with this invention.

In operations where several welds in parallel are produced simultaneously, be it by the double-point or single-point welding method, it can be achieved that by proper circuit arrangement the magnetic fields of the current passing through all welds simultaneously form together force components in such directions that the liquid particles from all the welds are ejected so that they fly all parallel to one another. This feature has particular advantage in heavy-duty welding machines of considerable width where by uni-directional ejection it is readily possible to arrange a guide board near the electrodes and to so incline it that the ejected particles gather in a receptacle. The by-product so gained constitutes chemically extraordinarily clean hammer scales and it is basically feasible to install a setup for the sole purpose of obtaining that product.

To centre the ejection effort at the welding point proper it is necessary to have there the highest concentration of current during the welding impulse. With highest current density at the point of material liquation, a maximum of ejection effect can be attained. According to this invention it is therefore advisable to make the contact surfaces between electrode and respective work piece larger than the contact area between the work pieces to be joined by welding. This procedure is contrary to prior practice, where, for example in sheet-metal welding, it was customary to reduce the electrode contact area to obtain maximum current concentration at this point, but in the present case it renders the additional advantage of reduced heating at the electrodes proper. To obtain highest current concentration between the contacting surfaces of the work pieces which later form the weld, proper steps have to be taken, and in sheet metal work proper relationship between electrode contact surface and contacting area between the sheets can be established by impressing suitable projections in the metal at the welding points. When welding wires in superposed arrangement it suffices to locate the weld between wires crossing each other at substantially right angle, and when welding bolts or rivets it is advisable to form the electrodes according to the shape of such elements to obtain here a larger contact area than the contact area between the elements to be joined.

The disclosed embodiments are only a few examples of forms the invention may take and other modifications and adaptations are possible in which cooling of the weld, instead of by water or other artificial means, is effected by removal of thermal units by substantial ejection of material melted by the welding current, and it is to be understood that such modifications rightfully fall within the scope and spirit of the appended claims.

What is claimed is:

1. A method of electric resistance welding, comprising the steps of pressing at least a pair of welding electrodes toward opposite outer surfaces of work pieces located between said welding electrodes with a force great enough to establish a selected contact pressure between the inner contacting surfaces of said work pieces; sending a current impulse through said electrodes to melt portions of said work pieces between said electrodes, said current impulse being great enough to create an electromagnetic force causing ejection of a portion of the molten material from the welding zone so as to cool said welding zone and so that the total thickness of the work pieces located between said electrodes is reduced by the ejection of portion of the molten material therefrom; and moving said electrodes with the current impulse passing therethrough toward each other with a speed fast enough to maintain said electrodes in contact with said outer surfaces of the work pieces and the contacting surfaces of said work pieces in contact with each other and to maintain the selected contact pressure between the contacting surfaces of said work pieces during the ejection of a portion of the molten material from the welding zone.

2. A method of electric resistance welding, comprising the steps of pressing at least a pair of resilient welding electrodes having a selected natural frequency toward opposite outer surfaces of work pieces located between said welding electrodes with a force great enough to establish a selected contact pressure between the inner contacting surfaces of said work pieces; sending a current impulse having a selected rise time greater than the rise time of said natural frequency of said welding electrodes through said electrodes to melt portions of said work pieces between said electrodes, said current impulse being great enough to create an electromagnetic force causing ejection of a portion of the molten material from the welding zone so as to cool said welding zone and so that the total thickness of the work pieces located between said electrodes is reduced by the ejection of portion of the molten material therefrom; and moving said electrodes with the current impulse passing therethrough toward each other with a speed fast enough to maintain said electrodes in contact with said outer surfaces of the work pieces and the contacting surfaces of said work pieces in contact with each other and to maintain the selected contact pressure between the contacting surfaces of said work pieces during the ejection of a portion of the molten material from the welding zone.

3. A method of electric resistance welding, comprising the steps of pressing at least a pair of resilient welding electrodes having a selected natural frequency toward opposite outer surfaces of work pieces located between said welding electrodes with a force great enough to establish a selected contact pressure between the inner contacting surfaces of said work pieces; controlling an alternating current to have a selected rise time greater than the rise time of said natural frequency of said welding electrodes; sending a current impulse of said controlled alternative current through said electrodes to melt portions of said work pieces between said electrodes, said current impulse being great enough to create an electromagnetic force causing ejection of a portion of the molten material from the welding zone so as to cool said welding zone and so that the total thickness of the work pieces located between said electrodes is reduced by the ejection of portion of the molten material therefrom; and moving said electrodes with the current impulse passing therethrough toward each other with a speed fast enough to maintain said electrodes in contact with said outer surfaces of the work pieces and the contacting surfaces of said work pieces in contact with each other and to maintain the selected contact pressure between the contacting surfaces of said work pieces during the ejection of a portion of the molten material from the welding zone.

4. An electric resistance welding apparatus, comprising, in combination, a pair of electrode means including at least one pair of welding electrodes mounted opposite each other for movement toward each other, and yieldable means resiliently supporting said electrodes for exertion of a selected contact pressure on the contacting surfaces of work pieces adapted to be located between opposite end surfaces of said welding electrodes, said yieldable means being tensioned when said welding electrodes are pressed against said work pieces, said electrode means having a selected natural frequency; means for sending a current impulse through said welding electrodes to melt portions of said work pieces between said electrodes and to create an electromagnetic force great enough to cause ejection of a portion of the molten material from the welding zone so as to cool said welding zone; and control means for controlling the rise time of said current impulse to a rise time greater than the rise time of said selected natural frequency of said electrode means, whereby said selected contact pressure between the contacting surfaces of the work pieces will be maintained during ejection of a part of the molten material from the welding zone.

5. An electric resistance welding apparatus, comprising, in combination, a pair of electrode means including at least one pair of welding electrodes mounted opposite each other for movement toward each other, and yieldable means resiliently supporting said electrodes for exertion of a selected contact pressure on the contacting surfaces of work pieces adapted to be located between opposite end surfaces of said welding electrodes, said yieldable means being tensioned when said welding electrodes are pressed against said work pieces, said electrode means having a selected natural frequency; means for sending a current impulse through said welding electrodes to melt portions of said work pieces between said electrodes and to create an electromagnetic force great enough to cause ejection of a portion of the molten material from the welding zone so as to cool said welding zone, said means including a step-down welding transformer having a primary winding adapted to be connected to a source of power and a secondary winding connected to said electrode means; and control means for controlling the rise time of said current impulse to a rise time greater than the rise time of said selected natural frequency of said electrode means, said control means including a condenser in parallel to the primary winding of said welding transformer, and conduit means of low inductance for connecting said secondary winding of said welding transformer with said electrode means, whereby said selected contact pressure between the contacting surfaces of the work pieces will be maintained during ejection of part of the molten material from the welding zone.

6. An electric resistance welding apparatus, comprising, in combination, a pair of electrode means including at least one pair of welding electrodes mounted opposite each other for movement toward each other, and yieldable means resiliently supporting said electrodes for exertion of a selected contact pressure on the contacting surfaces of work pieces adapted to be located between opposite end surfaces of said welding electrodes, said yieldable means being tensioned when said welding electrodes are pressed against said work pieces, said electrode means having a selected natural frequency; means for sending a current impulse through said welding electrodes to melt portions of said work pieces between said electrodes and to create an electromagnetic force great enough to cause ejection of a portion of the molten material from the welding zone so as to cool said welding zone, said means including a step-down welding transformer having a primary winding adapted to be connected to a source of power and a secondary winding connected to said electrode means; and control means for controlling the rise time of said current impulse to a rise time greater than the rise time of said selected natural frequency of said electrode means, said control means including a condenser in parallel to the primary winding of said welding transformer, a switch located in the connection between said condenser and said primary winding of said transformer, and conduit means of low inductance for connecting said secondary winding of said welding transformer with said electrode means, whereby said selected contact pressure between the contacing surfaces of the work pieces will be maintained during ejection of part of the molten material from the welding zone.

7. An electric resistance welding apparatus, comprising, in combination, a pair of electrode means including at least one pair of welding electrodes mounted opposite each other for movement toward each other, and yieldable means resiliently supporting said electrodes for exertion of a selected contact pressure on the contacting surfaces of work pieces adapted to be located between opposite end surfaces of said welding electrodes, said yieldable means being tensioned when said welding electrodes are pressed against said work pieces, said electrode means having a selected natural frequency; means for sending a current impulse through said welding electrodes to melt portions of said work pieces between said electrodes and to create an electromagnetic force great enough to cause ejection of a portion of the molten material from the welding zone so as to cool said welding zone, said means including a step-down welding transformer having a primary winding adapted to be connected to a source of power and a secondary winding connected to said electrode means; and control means for controlling the rise time of said current impulse to a rise time greater than the rise time of said selected natural frequency of said electrode means, said control means including a condenser in parallel to the primary winding of said welding transformer, a switch located in the connection between said condenser and said primary winding of said transformer, means for closing said switch when said selected contact pressure on the contacting surfaces of said work pieces is reached, and conduit means of low inductance for connecting said secondary winding of said welding transformer with said electrode means, whereby said selected contact pressure between the contacting surfaces of the work pieces will be maintained during ejection of part of the molten material from the welding zone.

References Cited in the file of this patent

UNITED STATES PATENTS

| | | |
|---|---|---|
| 1,168,346 | Thomson | Jan. 18, 1916 |
| 1,273,203 | Thomson | July 23, 1918 |
| 2,295,293 | Rogers | Sept. 8, 1942 |
| 2,331,537 | Clark | Oct. 12, 1943 |
| 2,375,439 | Rekosh | May 8, 1945 |
| 2,382,711 | Hagedorn | Aug. 14, 1945 |
| 2,446,648 | Glautzer | Aug. 10, 1948 |
| 2,661,416 | Eisenburger | Dec. 1, 1953 |

OTHER REFERENCES

"Welding Handbook," 1943, pp. 321–322.